(12) United States Patent
Lee et al.

(10) Patent No.: US 10,818,435 B2
(45) Date of Patent: Oct. 27, 2020

(54) CAPACITOR COMPONENT

(71) Applicant: Samsung Electro-Mechanics, Co., Ltd., Suwon-si, Gyeonggi-do (KR)

(72) Inventors: Taek Jung Lee, Suwon-si (KR); Jin Kyung Joo, Suwon-si (KR); Seung Woo Song, Suwon-si (KR); Hyo Youn Lee, Suwon-si (KR); Sung Kwon An, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 156 days.

(21) Appl. No.: 15/955,280

(22) Filed: Apr. 17, 2018

(65) Prior Publication Data

US 2019/0066922 A1    Feb. 28, 2019

(30) Foreign Application Priority Data

Aug. 25, 2017   (KR) .................. 10-2017-0108002

(51) Int. Cl.
*H01G 4/232*   (2006.01)
*H01G 4/224*   (2006.01)
(Continued)

(52) U.S. Cl.
CPC ............. *H01G 4/232* (2013.01); *H01G 4/012* (2013.01); *H01G 4/224* (2013.01); *H01G 4/236* (2013.01);
(Continued)

(58) Field of Classification Search
CPC ........... H01G 4/228; H01G 4/232; H01G 4/30
See application file for complete search history.

(56) References Cited

U.S. PATENT DOCUMENTS

2005/0207093 A1*  9/2005  Togashi .............. H01G 4/232
                                                        361/321.2
2006/0032666 A1   2/2006  Kim et al.
(Continued)

FOREIGN PATENT DOCUMENTS

CN    1738513 A    2/2006
CN    1905099 A    1/2007
(Continued)

OTHER PUBLICATIONS

First Office Action issued in Chinese Patent Application No. 201810964830.4 dated Jan. 7, 2020 (With English Translation).

*Primary Examiner* — Eric W Thomas
(74) *Attorney, Agent, or Firm* — Morgan, Lewis & Bockius LLP

(57) ABSTRACT

A capacitor component includes a body including an active layer and an upper cover and a lower cover disposed on an upper part and a lower part of the active layer, respectively; first internal electrodes and second internal electrodes disposed inside the active layer; a first active via and a second active via extending in a thickness direction of the active layer to be connected to the first and second internal electrodes, respectively; first and second cover vias extending in a thickness direction of the lower cover to be electrically connected to the first and second active vias and disposed at an interval narrower than an interval between the first and second active vias; and first and second lower electrodes disposed in a lower surface of the lower cover to be connected to the first and second cover vias, respectively.

20 Claims, 6 Drawing Sheets

(51) Int. Cl.
*H01G 4/236* (2006.01)
*H01G 4/012* (2006.01)
*H01G 4/30* (2006.01)
*H01G 4/12* (2006.01)

(52) U.S. Cl.
CPC ............ *H01G 4/30* (2013.01); *H01G 4/1227* (2013.01); *H01G 4/1245* (2013.01)

(56) References Cited

U.S. PATENT DOCUMENTS

| | | | |
|---|---|---|---|
| 2006/0092595 A1* | 5/2006 | Hwa Lee | H01G 2/065 361/306.3 |
| 2006/0249758 A1* | 11/2006 | Feichtinger | H01C 1/144 257/246 |
| 2007/0025057 A1 | 2/2007 | Togashi et al. | |
| 2007/0064374 A1* | 3/2007 | Togashi | H01G 4/232 361/307 |

FOREIGN PATENT DOCUMENTS

| | | |
|---|---|---|
| CN | 102655055 A | 9/2012 |
| JP | 2005-012106 A | 1/2005 |
| KR | 10-2006-0016058 A | 2/2006 |

\* cited by examiner

CAPACITOR COMPONENT

CROSS-REFERENCE TO RELATED APPLICATION(S)

This application is based on and claims the benefit of priority to Korean Patent Application No. 10-2017-0108002 filed on Aug. 25, 2017 in the Korean Intellectual Property Office, the entire disclosure of which is incorporated herein by reference.

TECHNICAL FIELD

The present disclosure relates to a capacitor component.

BACKGROUND

A multilayer ceramic capacitor, a capacitor component, is a chip type capacitor mounted on the printed circuit boards of various types of electronic products, such as image devices including a liquid crystal display (LCD) and a plasma display panel (PDP), a computer, a smartphone, a mobile phone, and the like, serving to charge or discharge electricity. Such a multilayer ceramic capacitor (MLCC) may be used as a component of various electronic devices due to advantages of miniaturization, high capacity, and ease of mounting.

An MLCC may be used as a component of various electronic devices due to the above mentioned advantages of miniaturization, high capacity, and ease of mounting, and recently, has been under development with a focus on high capacity and high reliability. To realize high capacity capacitors, there may be a method of increasing a dielectric constant of a material forming a capacitor body or reducing a thickness of a dielectric layer and an internal electrode to increase the number of stacked layers.

However, since it may not be easy to develop a composition of a high-k material, and methods currently in use may have a limit in reducing the thickness of the dielectric layer, these methods have limitations in increasing the capacity of the products. Therefore, in order to increase the capacity of the products simultaneously with implementing microminiaturization of the capacitors, research into a method of increasing an overlap area of internal electrodes having different polarities has been required. In recent years, attempts have been made to reduce the mounting area and the mounting height of the capacitor as the mounting density of the board increases.

SUMMARY

An aspect of the present disclosure may provide a capacitor component having improved electrical characteristics and excellent bending characteristics when mounted on a board or the like.

According to an aspect of the present disclosure, a capacitor component may include a body including an active layer and an upper cover and a lower cover disposed on an upper part and a lower part of the active layer, respectively; first internal electrodes and second internal electrodes disposed inside the active layer, a first active via and a second active via extending in a thickness direction of the active layer to be connected to the first and second internal electrodes, respectively; first and second cover vias extending in a thickness direction of the lower cover to be electrically connected to the first and second active vias and disposed at an interval narrower than an interval between the first and second active vias; and first and second lower electrodes disposed in a lower surface of the lower cover to be connected to the first and second cover vias, respectively.

The capacitor component may further include: first and second connection patterns connecting the first and second active vias to the first and second cover vias, respectively.

The first and second lower electrodes may extend in an outer side surface direction of the lower cover.

The first and second internal electrodes may not be disposed in the upper cover.

The first and second internal electrodes may not be disposed in the lower cover.

The first and second cover vias may be disposed further inwardly than the first and second active vias with respect to the outer side surfaces of the body.

The first and second active vias may extend to the upper cover to be exposed to an exterior of the body.

The capacitor component may further include an insulating protective layer covering the first and second active vias exposed to the exterior of the body.

The capacitor component may further include: first and second upper electrodes connected to the first and second active vias, respectively, exposed to the exterior of the body.

The capacitor component may further include third and fourth cover vias extending in a thickness direction of the upper cover to be electrically connected to the first and second active vias and disposed at an interval narrower than an interval between the first and second active vias.

The capacitor component may further include third and fourth connection patterns connecting the first and second active vias to the third and fourth cover vias, respectively.

The capacitor component may further include third and fourth upper electrodes disposed in an upper surface of the upper cover to be connected to the third and fourth cover vias, respectively.

The capacitor component may have a vertically symmetrical structure with respect to a center.

The first active via may penetrate through the second internal electrodes and may not be connected to the second internal electrodes.

The second active via may penetrate through the first internal electrodes and may not be connected to the first internal electrodes.

According to another aspect of the present disclosure, a capacitor component may include a body including an active layer and an upper cover and a lower cover disposed on an upper part and a lower part of the active layer, respectively; first internal electrodes and second internal electrodes disposed inside the active layer; a first active via and a second active via extending in a thickness direction of the active layer to be connected to the first and second internal electrodes, respectively; first and second cover vias extending in a thickness direction of the lower cover to be electrically connected to the first and second active vias, and being disposed closer to a center axis of the body in the thickness direction than the first and second active vias; and first and second lower electrodes disposed in a lower surface of the lower cover to be connected to the first and second cover vias, respectively.

The capacitor component may further include: first and second connection patterns connecting the first and second active vias to the first and second cover vias, respectively.

The first and second lower electrodes may extend in an outer side surface direction of the lower cover.

The first and second internal electrodes may not be disposed in the upper cover.

The first and second internal electrodes may not be disposed in the lower cover.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

Figure 1:
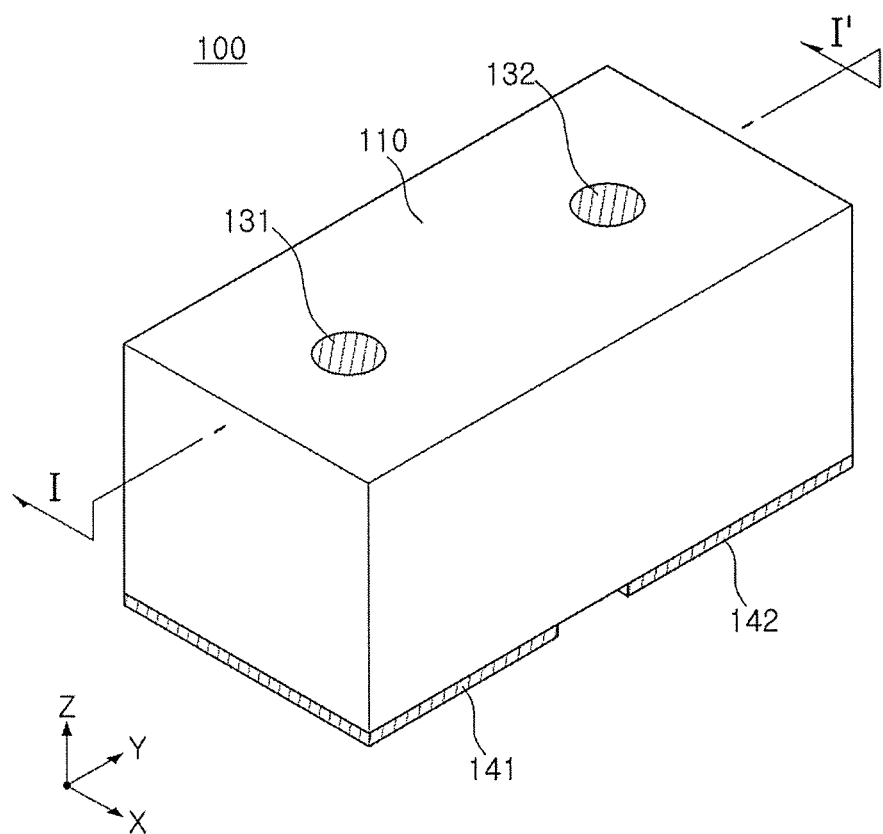
FIG. 1 is a perspective view schematically illustrating a capacitor component according to an exemplary embodiment of the present disclosure.
Figure 2:
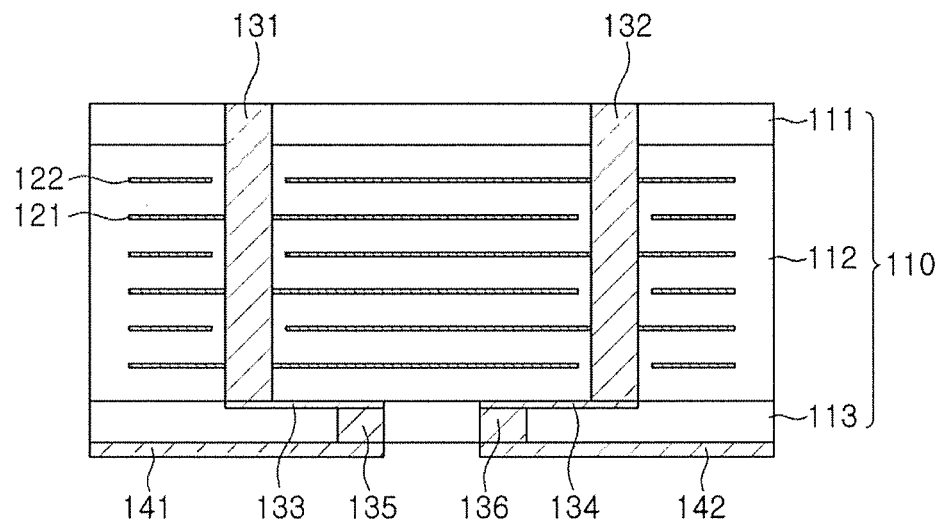
FIG. 2 is a cross-sectional view of the capacitor component of FIG. 1.
Figure 3:
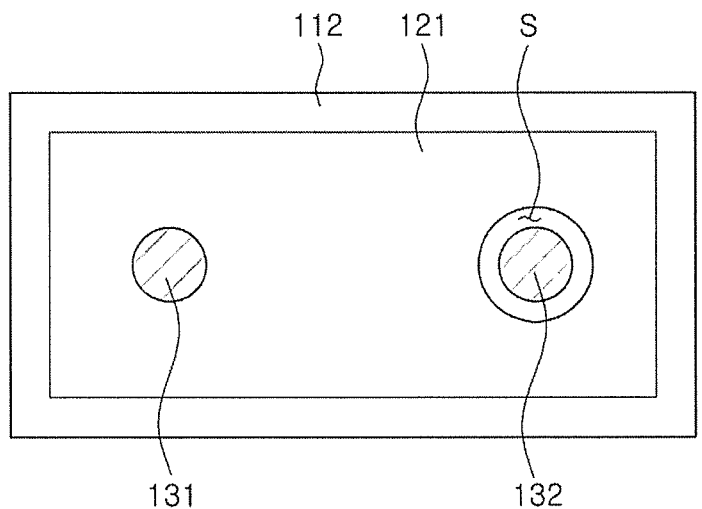
FIG. 3 is a diagram illustrating an internal electrode and an active via in the capacitor component of FIG. 1.
Figure 4:
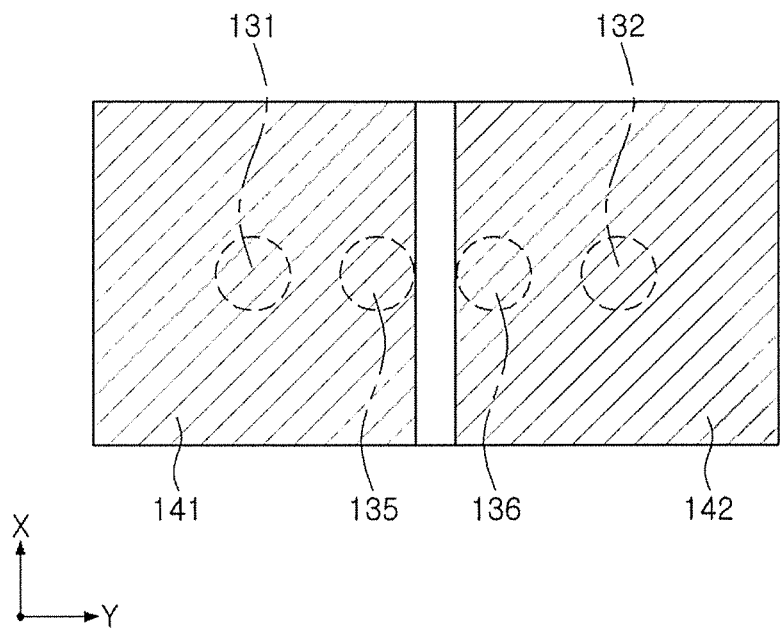
FIG. 4 is a diagram illustrating a lower electrode and a bottom view of the capacitor component of FIG. 1.

FIG. 1 is a perspective view schematically illustrating a capacitor component according to an exemplary embodiment in the present disclosure. FIG. 2 is a cross-sectional view of the capacitor component of FIG. 1. FIG. 3 is a diagram illustrating an internal electrode and an active via in the capacitor component of FIG. 1. FIG. 4 is a diagram illustrating a lower electrode and a bottom view of the capacitor component of FIG. 1.

Referring to FIGS. 1 through 4, a capacitor component 100 according to an exemplary embodiment of the present disclosure may include a body 110, first and second internal electrodes 121 and 122, first and second active vias 131 and 132, first and second cover vias 135 and 136, and first and second lower electrodes 141 and 142.

The body 110 may be formed by stacking a plurality of dielectric layers, and the dielectric layers may be formed of ceramics or the like known in the art. For example, the body 110 may be formed by sintering a green sheet containing a barium titanate ($BaTiO_3$)-based ceramic material or the like. In this case, $BaTiO_3$-based ceramic powder may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$ or the like in which calcium (Ca), zirconium (Zr) and the like are partially solidified in the $BaTiO_3$, and the $BaTiO_3$-based ceramic powder is not be limited thereto.

In this exemplary embodiment, the body 110 includes an upper cover 111, an active layer 112, and a lower cover 113, and the upper and lower covers 111 and 113 are formed at upper and lower parts of the active layer 112, respectively. The active layer 112 is an area including the first and second internal electrodes 121 and 122 to form an electric capacity. The upper and lower covers 111 and 113 may serve to protect the active layer 112 and the like, rather than serving to form the electric capacity. As shown in FIG. 2, the first and second internal electrodes 121 and 122 may not be disposed in the upper and lower covers 111 and 113.

However, the internal electrodes or other types of electrodes such as dummy electrodes may also be disposed in the upper and lower covers 111 and 113 as needed.

The first and second internal electrodes 121 and 122 may be disposed inside the active layer 112. The first and second internal electrodes 121 and 122 may be alternately disposed having different polarities, and may be formed by a method of printing a conductive paste on a ceramic green sheet, or the like. Examples of the material forming the first and second internal electrodes 121 and 122 may include nickel (Ni), copper (Cu), palladium (Pd), and alloys thereof. In addition, as the method of printing a conductive paste, a screen printing method or a gravure printing method may be used, but the printing method is not limited thereto.

The first and second active vias 131 and 132 may extend in a thickness direction (Z-axis direction in FIG. 2) of the active layer 112 to be connected to the first and second internal electrodes 121 and 122, respectively, and as shown in FIGS. 2 and 3, may be formed to penetrate through the active layer 112. These through-hole type active vias 131 and 132 may be provided to penetrate through the non-connected internal electrode of the first and second internal electrodes 121 and 122. In other words, as shown in FIG. 3, the second active via 132 may penetrate through the first internal electrodes 121 and may not be connected to the first internal electrodes 121, that is, an insulating space S may be interposed between the second active via 132 and the first internal electrodes 121. Similarly, the first active via 131 may penetrate through the second internal electrodes 122 and may not be connected to the second internal electrodes 122.

In this exemplary embodiment, the first and second active vias 131 and 132 extend to the upper cover 111 to be exposed to the exterior of the body 110. However, as in the modification to be described later, the first and second active vias 131 and 132 may be covered with a protective layer or an electrode.

Meanwhile, the first and second active vias 131 and 132 may be formed by forming holes in the body 110 and the first and second internal electrodes 121 and 122 and filling the holes with a conductive material. For the filling of the conductive material, a method of coating or plating a conductive paste or the like may be used. In this case, the holes of the body 110 may be obtained by forming holes on the ceramic green sheet by laser, punching or the like or by processing holes on the laminate after sintering.

The first and second cover vias 135 and 136 extend in the thickness direction of the lower cover 113 to be electrically connected to the first and second active vias 131 and 132. As shown in FIGS. 2 and 4, the first and second cover vias 135 and 136 are disposed at an interval narrower than an interval between the first and second active vias 131 and 132. In this case, first and second connection patterns 133 and 134 may be provided to connect the first and second active vias 131 and 132 to the first and second cover vias 135 and 136, respectively. To have a relatively narrow interval between the first and second cover vias 135 and 136, the first and second cover vias 135 and 136 may be disposed further inwardly than the first and second active vias 131 and 132 with respect to outer side surfaces of the body 110.

In the case of the through-hole type capacitor using the active vias 131 and 132, as the interval between the first and second active vias 131 and 132 becomes closer, the capacity may be effectively increased, whereas the bending strength may be lowered and a region where the first and second active vias 131 and 132 are densely formed may be damaged by an external stress. Additionally, a short may occur between the first and second active vias 131 and 132 when a printing or a mounting step. In this exemplary embodiment, a stress concentration on a central region of the body 110 may be prevented by relatively reducing the interval between the first and second cover vias 135 and 136 disposed in the lower cover 113 rather than reducing the interval between the first and second active vias 131 and 132. As a result, the overall bending strength of the capacitor component 100 may be improved, and thus the occurrence of cracks and the like may be reduced even if an external stress is applied. In addition, equivalent series inductance (ESL) characteristics may also be improved by applying the first and second cover vias 135 and 136 having the relatively narrow interval to a lower part of the active layer 112.

The first and second lower electrodes 141 and 142 may be disposed in a lower surface of the lower cover 113 to be connected to the first and second cover vias 135 and 136, respectively. Specifically, the first and second lower electrodes 141 and 142 may extend in an outer side surface direction of the lower cover 113. However, if necessary, the shape of the first and second lower electrodes 141 and 142 may be appropriately deformed. The first and second lower electrodes 141 and 142 may be provided as the region in which the capacitor component 100 is mounted on the board or the like, and may have a multilayer structure if necessary.

Figure 5:
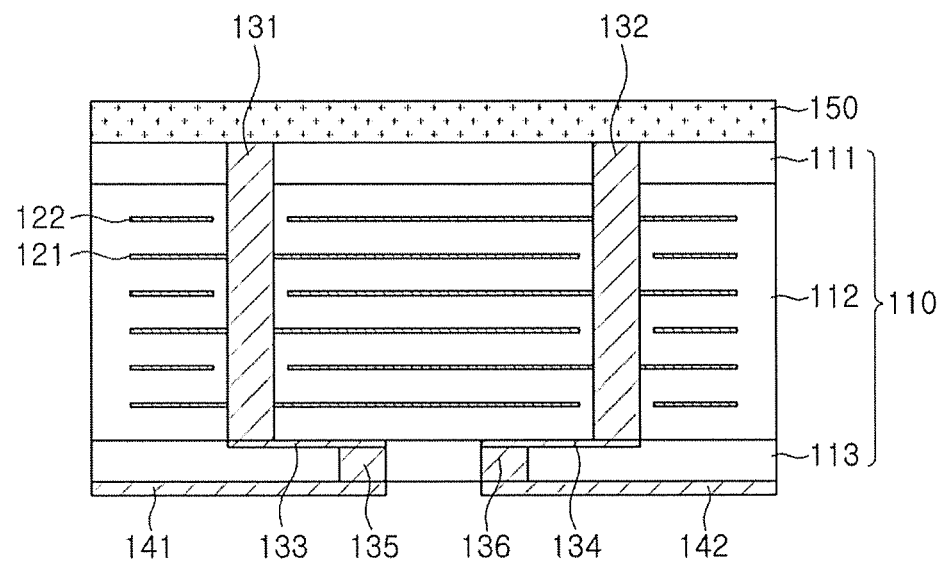
FIGS. 5 through 7 are diagrams illustrating examples of the present disclosure in which an upper portion of the capacitor component in the exemplary embodiment of FIGS. 1-4 is modified.
Figure 6:
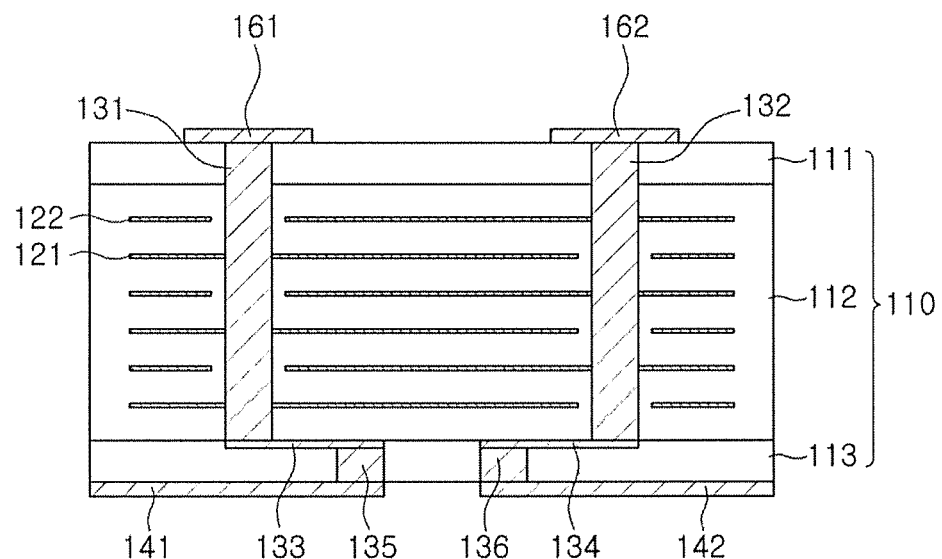
Figure 7:
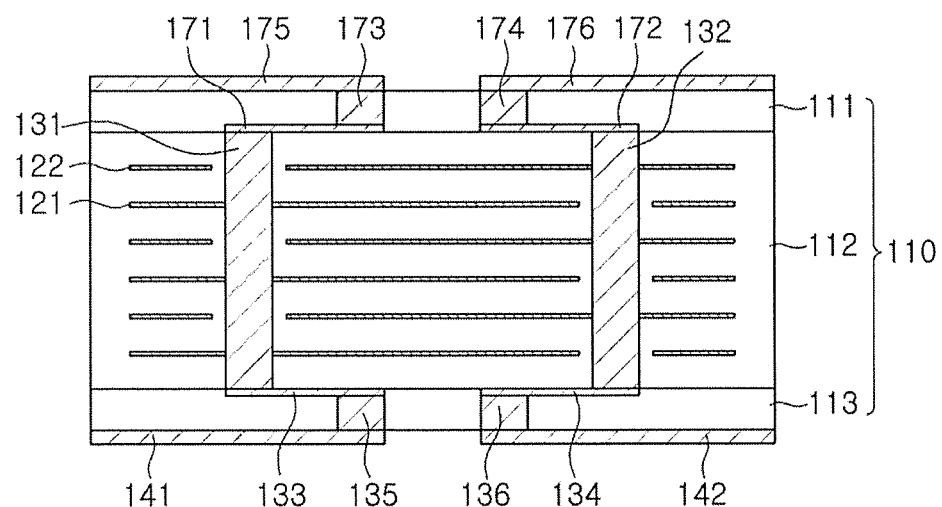

FIGS. 5 through 7 are diagrams illustrating examples of the present disclosure in which an upper portion of the capacitor component in the exemplary embodiment of FIGS. 1-4 is modified. Describing the modified exemplary embodiment, first, an exemplary embodiment of FIG. 5 may further include an insulating protective layer 150 in the above-described exemplary embodiment. The insulating protective layer 150 may cover the first and second active vias 131 and 132 exposed to the exterior of the body 110, thereby improving the electrical stability.

As in an exemplary embodiment of FIG. 6, upper electrodes 161 and 162 may be disposed instead of the insulating protective layer. The first and second upper electrodes 161 and 162 may be connected to each of the first and second active vias 131 and 132 exposed to the exterior of the body 110. The upper electrodes 161 and 162 may be disposed in the upper surface of the body 110 to be connected to the active vias 131 and 132, and may have the same material and the same multilayer structure as the first and second lower electrodes 141 and 142, which is not essential. In the case where the first and second lower electrodes 141 and 142 may be provided as the mounting region, the capacitor component 100 may be operated even if no electrode is formed in the upper portion of the body 110. However, as the electrodes 141 and 142 are formed only in the lower part of the body 110, the bending characteristics of the upper and lower parts may be different. As a result, the capacitor component 100 mounted on the board or the like may be bent, and as a result, the reliability in, for example, adhesive strength to the board may be reduced. As in the exemplary embodiment of FIG. 6, the upper electrodes 161 and 162 may provide an additional bending suppressing effect. In order to maximize this effect, the shapes and sizes of the upper electrodes 161 and 162 may be appropriately modified.

Next, in an exemplary embodiment of FIG. 7, similarly to the lower cover 113, third and fourth cover vias 173 and 174 having a relatively narrow interval may also be disposed in the upper cover 111. In other words, the third and fourth cover vias 173 and 174 may extend in the thickness direction of the upper cover 111 to be electrically connected to the first and second active vias 131 and 132, and may be disposed at an interval narrower than the interval between the first and second active vias 131 and 132. In addition, the first and second active vias 131 and 132 and the third and fourth cover vias 173 and 174 may be connected to each other by third and fourth connection patterns 171 and 172. The upper electrodes 175 and 176 may be formed in the upper cover 111 to be connected to the third and fourth cover vias 173 and 174.

As in the present exemplary embodiment, as the third and fourth cover vias 173 and 174 are also disposed on the upper cover 111, the capacitor component 100 may have a vertically symmetrical structure with respect to the center. By the symmetrical structure, the capacitor component 100 may be mounted without limiting the mounting direction and the bending characteristics may be further improved.

Hereinafter, a method of manufacturing a capacitor component having the above-described structure will be described with reference to FIGS. 8 through 11. The structure of the capacitor component may be more clearly understood with reference to the description of the manufacturing method. In addition, although the manufacturing method is described below with reference to the exemplary embodiment of FIG. 2, the manufacturing method may also be applied to the capacitor component of other exemplary embodiments.

Figure 8:
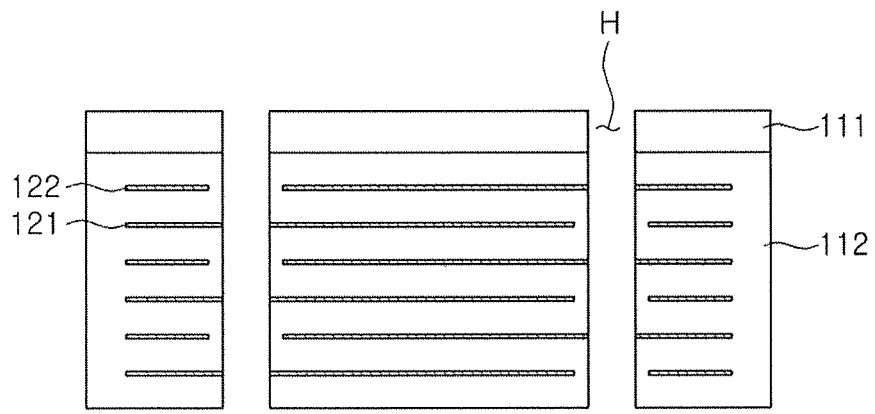
FIGS. 8 through 11 are diagrams illustrating a process of manufacturing a capacitor component according to an exemplary embodiment in the present disclosure.

First, as shown in FIG. 8, a through hole H may be formed in a laminate in which an active layer 112 and an upper cover 111 are stacked. The active layer 112 and the upper cover 111 may be obtained, for example, by applying the conductive paste to the ceramic green sheet and repeatedly stacking the ceramic green sheet. Further, the through hole H may be formed in the laminate by the laser, mechanical machining or the like.

Figure 9:
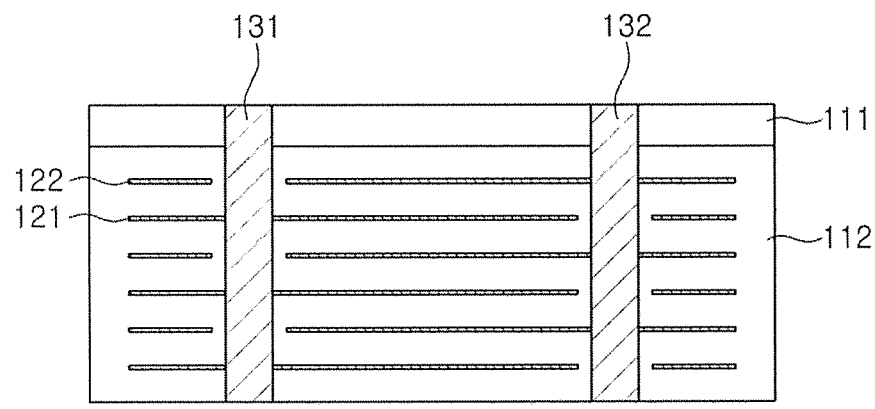

Next, as shown in FIG. 9, the first and second active vias 131 and 132 connected to the first and second internal electrodes 121 and 122, respectively, may be formed by filling the through hole H with a conductive material. As described above, the first and second active vias 131 and 132 may be formed by the method of coating or plating the conductive material in the form of the conductive paste, or the like.

Figure 10:
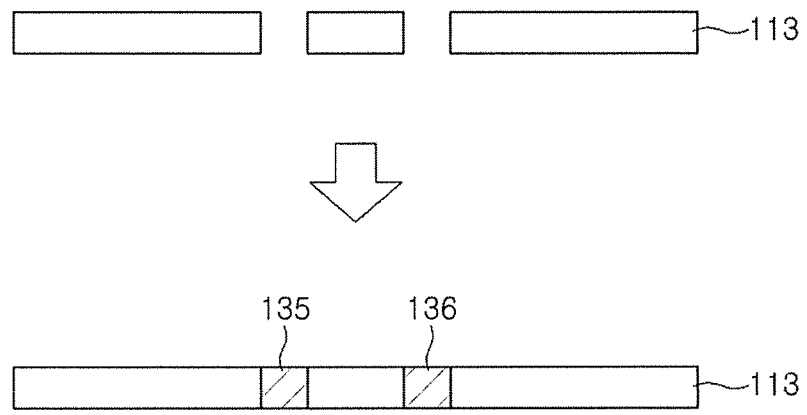

Next, as shown in FIG. 10, another through hole may be formed in the lower cover 113 and filled with a conductive material to form the first and second cover vias 135 and 136. However, the present exemplary embodiment describes the method of separately manufacturing the lower cover 113 and coupling the lower cover 113 to the active layer 112. However, the first and second cover vias 135 and 136 may also be formed after the lower cover 113 is coupled with the active layer 112.

Figure 11:
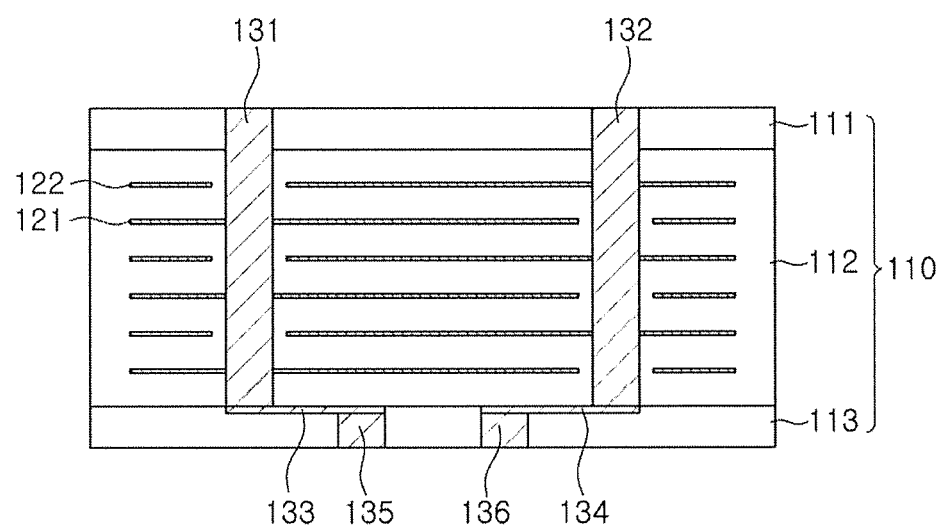

Next, as shown in FIG. 11, the active layer 112 and the lower cover 113 may be coupled with each other, and the first and second active vias 131 and 132 and the first and second cover vias 135 and 136 may also be electrically connected to each other. For this purpose, the connection patterns 133 and 134 may be formed under the active layer 112 before the active layer 112 and the lower cover 113 are coupled with each other. Thereafter, the first and second lower electrodes 141 and 142 may be formed in the lower surface of the lower cover 113, and screen printing, line patterning, or the like may be used. Thereafter, the capacitor component may be realized by sintering the laminate obtained in the process and performing the suitable plating process or the like to cover the electrode.

As set forth above, according to the exemplary embodiment in the present disclosure, the electrical characteristics such as the ESL characteristics of the capacitor component may be improved. In addition, the bending characteristics may be improved when the capacitor component is mounted on the board or the like.

While exemplary embodiments have been shown and described above, it will be apparent to those skilled in the art that modifications and variations could be made without departing from the scope of the present disclosure as defined by the appended claims.

What is claimed is:

1. A capacitor component, comprising:
a body including an active layer and an upper cover and a lower cover disposed on an upper part and a lower part of the active layer, respectively;
first internal electrodes and second internal electrodes disposed inside the active layer;
a first active via and a second active via extending in a thickness direction of the active layer to be connected to the first and second internal electrodes, respectively;
first and second cover vias extending in a thickness direction of the lower cover to be electrically connected to the first and second active vias and disposed at an interval narrower than an interval between the first and second active vias; and
first and second lower electrodes disposed on a surface of the lower cover to be connected to the first and second cover vias, respectively,
wherein the first and second cover vias are aligned with respective ends of the first and second lower electrodes.

2. The capacitor component of claim 1, further comprising:
first and second connection patterns connecting the first and second active vias to the first and second cover vias, respectively.

3. The capacitor component of claim 1, wherein the first and second lower electrodes extend in an outer side surface direction of the lower cover.

4. The capacitor component of claim 1, wherein the first and second internal electrodes are not disposed in the upper cover.

5. The capacitor component of claim 1, wherein the first and second internal electrodes are not disposed in the lower cover.

6. The capacitor component of claim 1, wherein the first and second cover vias are disposed further inwardly than the first and second active vias with respect to outer side surfaces of the body.

7. The capacitor component of claim 1, wherein the first and second active vias extend to the upper cover to be exposed to an exterior of the body.

8. The capacitor component of claim 7, further comprising:
an insulating protective layer covering the first and second active vias exposed to the exterior of the body.

9. The capacitor component of claim 7, further comprising:
first and second upper electrodes connected to the first and second active vias, respectively, exposed to the exterior of the body.

10. The capacitor component of claim 1, further comprising:
third and fourth cover vias extending in a thickness direction of the upper cover to be electrically connected to the first and second active vias and disposed at an interval narrower than the interval between the first and second active vias.

11. The capacitor component of claim 10, further comprising:
third and fourth connection patterns connecting the first and second active vias to the third and fourth cover vias, respectively.

12. The capacitor component of claim 10, further comprising:
third and fourth upper electrodes disposed on an upper surface of the upper cover to be connected to the third and fourth cover vias, respectively.

13. The capacitor component of claim 10, wherein the capacitor component has a vertically symmetrical structure with respect to a center.

14. The capacitor component of claim 1, wherein the first active via penetrates through the second internal electrodes and is not connected to the second internal electrodes.

15. The capacitor component of claim 1, wherein the second active via penetrates through the first internal electrodes and is not connected to the first internal electrodes.

16. A capacitor component, comprising:
a body including an active layer and an upper cover and a lower cover disposed on an upper part and a lower part of the active layer, respectively;
first internal electrodes and second internal electrodes disposed inside the active layer;
a first active via and a second active via extending in a thickness direction of the active layer to be connected to the first and second internal electrodes, respectively;
first and second cover vias extending in a thickness direction of the lower cover to be electrically connected to the first and second active vias, and being disposed closer to a center axis of the body in the thickness direction than the first and second active vias; and
first and second lower electrodes disposed on a lower surface of the lower cover to be connected to the first and second cover vias, respectively,
wherein, in a bottom view of the capacitor component, a region defined between the first and second cover vias is devoid of at least one of the first and second lower electrodes.

17. The capacitor component of claim 16, further comprising:
first and second connection patterns connecting the first and second active vias to the first and second cover vias, respectively.

18. The capacitor component of claim 16, wherein the first and second lower electrodes extend in an outer side surface direction of the lower cover.

19. The capacitor component of claim 16, wherein the first and second internal electrodes are not disposed in the upper cover nor in the lower cover.

20. A capacitor component, comprising:
a body including an active layer and an upper cover and a lower cover disposed on an upper part and a lower part of the active layer, respectively;
first internal electrodes and second internal electrodes disposed inside the active layer;
a first active via and a second active via extending in a thickness direction of the active layer to be connected to the first and second internal electrodes, respectively;
first and second cover vias extending in a thickness direction of the lower cover to be electrically connected to the first and second active vias and disposed at an interval narrower than an interval between the first and second active vias; and first and second lower electrodes disposed on a surface of the lower cover to be connected to the first and second cover vias, respectively, wherein, in a bottom view of the capacitor component, a region defined between the first and second cover vias is devoid of at least one of the first and second lower electrodes, and the first and second lower electrodes are mounted onto a printed circuit board.

* * * * *